March 30, 1937.  M. B. JACKSON  2,075,440
ANTIGLARE DEVICE
Filed Sept. 17, 1934

Inventor
M. B. Jackson
by George P. Mackie
ATTY.

Patented Mar. 30, 1937

2,075,440

UNITED STATES PATENT OFFICE 2,075,440

ANTIGLARE DEVICE

Maunsell B. Jackson, Toronto, Ontario, Canada

Application September 17, 1934, Serial No. 744,359
In Canada September 19, 1933

4 Claims. (Cl. 296—97)

This invention relates to anti-glare devices for motor cars and my object is to provide a cheap and simple device which may be controlled by the driver without removing his hands from the steering wheel, to move the device into and out of its operative position, to shield his eyes from the glare of approaching headlights while passing them.

I attain my objects by hinging an eye shield of tinted celluloid, or other suitable material, in front of the driver. The eyeshield is carried on parallel arms adapted to be rotated to lift it in a plane substantially parallel with the plane of the windshield, into the driver's line of vision.

To one of these arms is attached one end of a flexible and extensible member in such a manner that when the member is stressed the eyeshield will be lifted up into the driver's line of vision. The other end of the member is attached to a finger lever rotatably carried on the steering column and the length of the member is so adjusted that the finger lever may be easily moved to slacken the member, to release the arm, to allow the eyeshield to fall of its own weight out of the driver's line of vision.

The constructions are hereinafter more fully described and are illustrated in the accompanying drawing in which Fig. 1 is a front view, in partial section, illustrating my device in position on a windshield, with the eyeshield up.

In the drawing like numerals of reference indicate corresponding parts in the different figures.

Figure 3:
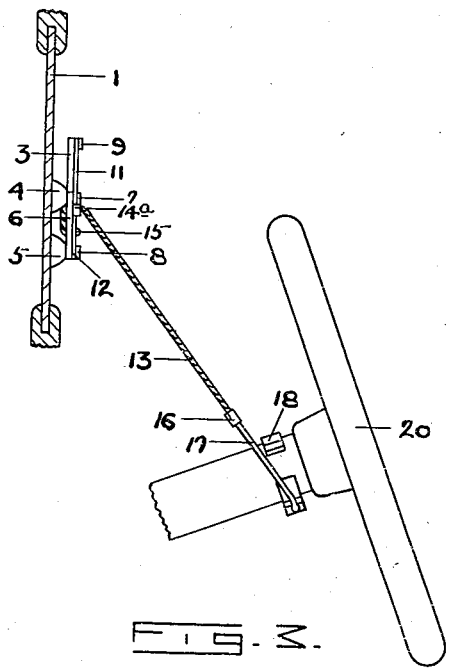
Fig. 3 is a side elevation, in partial section, of Fig. 1.

1 is the windshield of a motor car, 2 the steering column, 3 the eyeshield, 4 and 5 vacuum cups attached by suction to the windshield and carrying a bar or strip 6. To this bar 6 are fixed pins 7 and 8 and to the eyeshield 3 are fixed pins 9 and 10. Between these pins the parallel arms 11 and 12 serve as links being rotatably hung on the pins 7 and 8 at one end and on the pins 9 and 10 at the other end. A cord 13 passes freely through a hole 14 on the bar 6 and is attached at one end to the arm 12 at 15 and at the other end by the clip 16 to an extensible section 17, preferably made of rubber. The hole 14 is surrounded by a boss 14ᵃ which limits the downward movement of the upper arm 11, and therefore the downward movement of the shield as a whole. The extensible section 17 is attached to the hand lever 18 by stretching it into the slot 19. The hand lever 18 is rotatably attached to the steering column 2, the end of the lever being bent to form a hook, the jaws of which are normally a distance apart somewhat less than the diameter of the steering column. It will be seen that in positioning the lever on the steering column, the hook has to be slightly opened up, thus causing sufficient friction between the hook and steering column to hold the lever in approximately the position to which it is moved. 20 is the steering wheel.

The operation is as follows.

Figure 1:
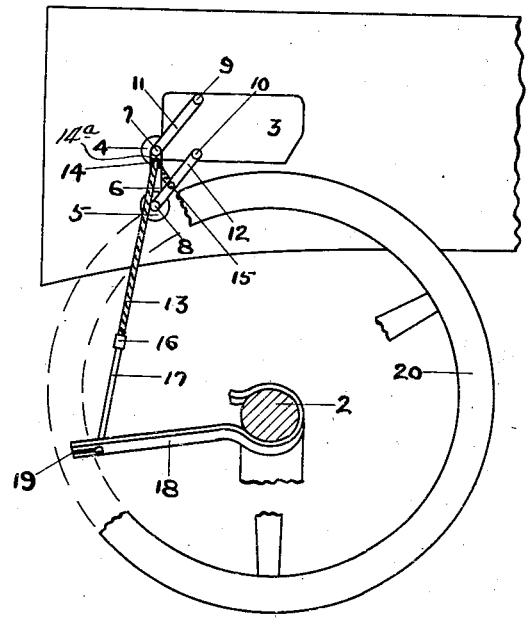
Figure 2:
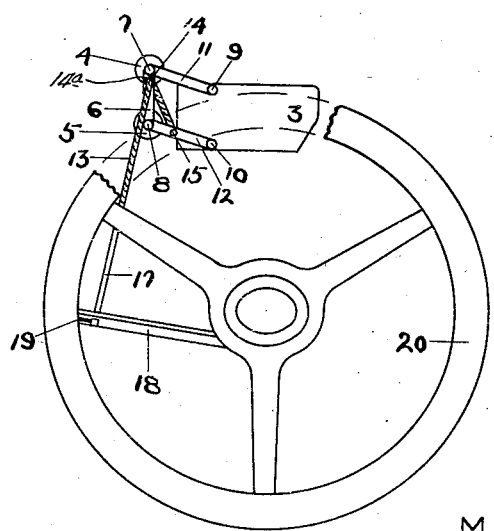
Fig. 2 is a similar view with the eyeshield down.

Assuming that the device is in the position shown in Fig. 2 with the eyeshield down, the arm 11 engaging the boss 14, and the cord 13 is slack, to protect his eyes from approaching glare the driver will rock the lever 18 with his finger to stress the cord 13 and stretch the extensible portion 17 of the latter, and thus the eyeshield will be moved into the position shown in Fig. 1 to shield the eyes.

When the glare is past the lever 18 should be moved in the opposite direction at once and the eyeshield allowed to drop. The reason why this should be done is that as the dimming effect of the shield is such that the driver can plainly see the road and objects thereon when illuminated by the headlights of two cars—his own and the one approaching—the dimming effect must be too great when the road is illuminated only by the driver's own lights so that if the eyeshield is left up after the glare is past there will be a blind spot on the road fully as dangerous as the blind spot caused by unprotected glare.

The extensible section 17 has a double function—

1. The putting of undue stress on the device is prevented.

2. The lever 18 may be rotated a little further than necessary to lift the eyeshield, and thus stretches the extensible section 17 of the cord to put it under greater tension. This stretching of the extensible section 17 permits a slight back lash of the lever, while there is still sufficient tension in the extensible section to hold the eyeshield in its operative position.

The boss 14ᵃ serves as a stop functioning with the arm 11 to fix the down, or inoperative, position of the eyeshield. The up, or operative, position is fixed by the lower left hand corner of the eyeshield coming in contact with the bar 6.

I have shown the cord 13 fastened to the arm 12, at 15 but it is obvious that the cord might be fastened directly to the shield 3 without interfering with the operation of the device.

What I claim is:—

1. For use with a motor vehicle having a steering column, an anti-glare device comprising a support; an eyeshield; a pair of parallel arms pivotally connected at one end with the support and at the other end with the eyeshield; and means for rocking said arms and shield to move the latter into and out of its operative position, said means including a flexible member and an operating lever to which the flexible member is connected, means at one end of said operating lever adapted to frictionally and resiliently engage the steering column, said flexible member being elastic for at least a portion of its length to permit the lever to move a greater distance than necessary to move the eyeshield to its operative position.

2. For use with a motor vehicle having a steering column, an anti-glare device comprising a support having a hole therethrough, an eyeshield; a pair of parallel arms pivotally connected at one end with the support and at the other end with the eyeshield; a flexible member threaded through said hole in the support and having one end connected with one of said parallel arms; and an operating lever to which the other end of the flexible member is connected, means at one end of said operating lever adapted to be frictionally and resiliently mounted upon the steering column, said flexible member being elastic for at least a portion of its length to permit the lever to move a greater distance than necessary to move the eyeshield to its operative position.

3. For use with a motor vehicle having a steering column, an anti-glare device comprising a support; an eyeshield movably mounted on said support and normally tending to occupy an inoperative position; a guide on said support; a flexible member connected at one end with said eyeshield, and passing over said guide; an operating lever to which the other end of the flexible member is connected; and means at one end of said operating lever adapted to frictionally engage the steering column, said flexible member being elastic for at least a portion of its length to permit the lever to move a greater distance than necessary to move the eyeshield to its operative position.

4. For use with a motor vehicle having a steering column, an anti-glare device comprising a support; an eyeshield movably mounted on said support and normally tending to occupy an inoperative position; a guide on said support; a flexible member connected at one end with said eyeshield, and passing over said guide; an operating lever to which the other end of the flexible member is connected; said operating lever having one end adapted to be fulcrumed upon the steering column, said flexible member being elastic for at least a portion of its length to permit the lever to move a greater distance than necessary to move the eyeshield to its operative position.

MAUNSELL B. JACKSON.